(12) United States Patent
Mossoba et al.

(10) Patent No.: US 11,637,824 B2
(45) Date of Patent: *Apr. 25, 2023

(54) MULTI-FACTOR AUTHENTICATION DEVICES

(71) Applicant: Capital One Services, LLC, McLean, VA (US)

(72) Inventors: Michael Mossoba, Arlington, VA (US); Abdelkadar M'Hamed Benkreira, Washington, DC (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 101 days.

This patent is subject to a terminal disclaimer.

(21) Appl. No.: 17/301,035

(22) Filed: Mar. 23, 2021

(65) Prior Publication Data

US 2021/0211416 A1 Jul. 8, 2021

Related U.S. Application Data

(63) Continuation of application No. 16/440,075, filed on Jun. 13, 2019, now Pat. No. 10,992,659, which is a
(Continued)

(51) Int. Cl.
*H04L 29/06* (2006.01)
*H04L 9/40* (2022.01)
(Continued)

(52) U.S. Cl.
CPC ............ *H04L 63/083* (2013.01); *G06F 21/40* (2013.01); *G06F 21/554* (2013.01);
(Continued)

(58) Field of Classification Search
None
See application file for complete search history.

(56) References Cited

U.S. PATENT DOCUMENTS 9,210,156 B1 12/2015 Little et al.
9,536,069 B1 1/2017 Shah et al.
(Continued)

OTHER PUBLICATIONS

Renaud, "A Support Architecture for Multi-Channel, Multi-Factor Authentication." 2014, pp. 1-8. (Year: 2014).*
(Continued)

*Primary Examiner* — Benjamin E Lanier
(74) *Attorney, Agent, or Firm* — Harrity & Harrity, LLP

(57) ABSTRACT

A device may receive a request from a first user device to access a protected device. The device may verify a user identity of a user of the first device based on user credentials and determine that an authentication code is needed to authenticate the request to access the protected device. The device may dynamically generate multiple codes and transmit the multiple codes to a second user device associated with the user identity of the user of the first device. A first code, of the multiple codes, may correspond to a correct authentication code needed to authenticate the request to access the protected device. The device may transmit a message including an instruction for identifying the correct authentication code from among the multiple codes, receive a second code from the first device, compare the second code and the first code, and selectively authenticate the request to access the protected device.

20 Claims, 10 Drawing Sheets

Related U.S. Application Data continuation of application No. 16/002,927, filed on Jun. 7, 2018, now Pat. No. 10,360,367.

(51) Int. Cl.
*G06F 21/40* (2013.01)
*G06F 21/55* (2013.01)
*G06F 3/16* (2006.01)

(52) U.S. Cl.
CPC ............ H04L 63/0853 (2013.01); *G06F 3/16* (2013.01); *G06F 2221/034* (2013.01)

(56) References Cited

U.S. PATENT DOCUMENTS

| | | |
|---|---|---|
| 9,628,459 B2 | 4/2017 | Greenspan et al. |
| 9,756,056 B2 | 9/2017 | Churyumov et al. |
| 9,801,061 B2 | 10/2017 | Mohan et al. |
| 10,013,728 B2 | 7/2018 | Schechter et al. |
| 10,360,367 B1 | 7/2019 | Mossoba et al. |
| 10,405,186 B1 | 9/2019 | Latsha et al. |
| 10,992,659 B2 * | 4/2021 | Mossoba ............... H04W 12/06 |
| 2007/0214354 A1 | 9/2007 | Renaud |
| 2008/0098464 A1 | 4/2008 | Mizrah et al. |
| 2011/0302645 A1 | 12/2011 | Headley et al. |
| 2012/0066749 A1 | 3/2012 | Taugboel et al. |
| 2013/0054433 A1 | 2/2013 | Giard et al. |
| 2013/0132091 A1 | 5/2013 | Skerpac et al. |
| 2014/0096210 A1 | 4/2014 | Dabbiere |
| 2014/0189808 A1 | 7/2014 | Mahaffey et al. |
| 2014/0189829 A1 | 7/2014 | Mclachlan et al. |
| 2014/0365780 A1 * | 12/2014 | Movassaghi .......... H04L 9/3228 713/184 |
| 2015/0066764 A1 | 3/2015 | Crowell et al. |
| 2015/0073992 A1 * | 3/2015 | Weiner ............... G06Q 20/3278 705/44 |
| 2017/0346851 A1 | 11/2017 | Drake |
| 2019/0377864 A1 | 12/2019 | Mossoba et al. |

OTHER PUBLICATIONS

Extended European Search Report for Application No. EP19179034. 4, dated Oct. 24, 2019, 7 pages.

Renaud K., "A Support Architecture for Multi-Channel, Multi-Factor Authentication,"2014, pp. 1-8, XP055631287, [Retrieved on Oct. 11, 2019] Retrieved from the Internet [URL: http://citeseerx. ist.psu.edu/viewdoc/download;jsessionid= 9FB99BD7F19C4492610F66C57A711396?].

\* cited by examiner

MULTI-FACTOR AUTHENTICATION DEVICES

RELATED APPLICATION

This application is a continuation of U.S. patent application Ser. No. 16/440,075, filed Jun. 13, 2019, which is a continuation of U.S. patent application Ser. No. 16/002,927, filed Jun. 7, 2018 (now U.S. Pat. No. 10,360,367), the contents of which are incorporated herein by reference in their entireties.

BACKGROUND

Multi-factor authentication is a method of authenticating a user's claimed identity in which a user is granted access to a protected resource (e.g., an automated teller machine (ATM), web access to information regarding a bank account, etc.) only after successfully presenting two or more pieces of evidence, or factors, to an authentication service. Factors the user may present for authentication may include knowledge-based factors (e.g., a username, password, etc., based on information the user knows), possession-based factors (e.g., a device, a token, etc., based on something in the user's possession), or inherency-based factors (e.g., a fingerprint, voice, biometric information, etc., based on something the user is).

SUMMARY

According to some possible implementations, a method may include receiving, by a processor, a request from a first user device to access a protected device. The request may be from the first user device and include user credentials. The user credentials may be associated with a user identity of a user of the first user device. The method may include verifying, by the processor, the user identity of the user of the first user device based on comparing the user credentials received in the request from the first user device and a user profile. The method may include determining, by the processor, that an authentication code is needed to authenticate the request received from the first user device to access the protected device based on verifying the user identity of the user of the first user device. The method may include dynamically generating, by the processor, a plurality of codes based on determining that the authentication code is needed to authenticate the request received from the first user device to access the protected device. A first code, of the plurality of codes, may correspond to a correct authentication code needed to authenticate the request received from the first user device to access the protected device. The method may include determining, by the processor, a second user device associated with the user identity of the user of the first user device after verifying the user identity. The method may include transmitting, by the processor, the plurality of codes to the second user device associated with the user identity of the user of the first user device. The method may include transmitting, by the processor, a message including an instruction for identifying the correct authentication code from among the plurality of codes. The method may include transmitting, by the processor and to the first user device, an authentication request that includes a request for the correct authentication code. The method may include receiving, by the processor and from the first user device, a response to the authentication request that includes a second code, comparing, by the processor, the second code and the first code, and selectively authenticating, by the processor, the request from the first user device to access the protected device, based on a result of comparing the second code and the first code, to selectively grant the first user device access to the protected device.

According to some possible implementations, a device may include one or more memories, and one or more processors, communicatively coupled to the one or more memories, to receive a request from a first user device to access a protected device. The request may be received from the first user device and include user credentials. The user credentials may be associated with a user identity of a user of the first user device. The one or more processors may verify the user identity of the user of the first user device based on comparing the user credentials received in the request from the first user device and a user profile. The one or more processors may determine that an authentication code is needed to authenticate the request received from the first user device to access the protected device based on verifying the user identity of the user of the first user device. The one or more processors may dynamically generate a plurality of codes based on determining that the authentication code is needed to authenticate the request received from the first user device to access the protected device. A first code, of the plurality of codes, may correspond to a correct authentication code needed to authenticate the request received from the first user device to access the protected device. The one or more processors may determine a second user device associated with the user identity of the user of the first user device after verifying the user identity of the user of the first user device. The one or more processors may transmit the plurality of codes to the second user device associated with the user identity of the user of the first user device. The one or more processors may transmit a message to the first user device. The message may include an instruction for identifying the correct authentication code from among the plurality of codes. The message may be configured for display on the first user device. The one or more processors may transmit, to the first user device, an authentication request that includes a request for the correct authentication code, receive, from the first user device, a response to the authentication request that includes a second code, compare the second code and the first code, and selectively authenticate the request from the first user device to access the protected device based on a result of comparing the second code and the first code to selectively grant the first user device access to the protected device.

According to some possible implementations, a non-transitory computer-readable medium may store one or more instructions that, when executed by one or more processors, cause the one or more processors to receive a request from a first user device to access a protected resource. The request may be received from the first user device includes user credentials. The user credentials may be associated with a user identity of a user of the first user device. The one or more instructions, when executed by the one or more processors, may cause the one or more processors to verify the user identity of the user of the first user device based on comparing the user credentials received in the request from the first user device and a user profile. The one or more instructions, when executed by the one or more processors, may cause the one or more processors to determine that an authentication code is needed to authenticate the request received from the first user device to access the protected resource based on verifying the user identity of the user of the first user device. The one or more instructions, when executed by the one or more processors, may cause the one or more processors to dynamically generate a plurality of codes based on determining that the authentication code is needed to authenticate the request received from the first user device to access the protected resource. A first code, of the plurality of codes, may correspond to a correct authentication code needed to authenticate the request received from the first user device to access the protected resource. The one or more instructions, when executed by the one or more processors, may cause the one or more processors to store the plurality of codes in a storage device, determine a second user device associated with the user identity of the user of the first user device after verifying the user identity of the user of the first user device, and transmit the plurality of codes to the second user device associated with the user identity of the user of the first user device. The one or more instructions, when executed by the one or more processors, may cause the one or more processors to transmit, to a third user device associated with the user identity of the user of the first user device, a message including an instruction for identifying the correct authentication code from among the plurality of codes. The one or more instructions, when executed by the one or more processors, may cause the one or more processors to transmit, to the first user device, an authentication request that includes a request for the correct authentication code. The one or more instructions, when executed by the one or more processors, may cause the one or more processors to receive, from the first user device, a response to the authentication request that includes a second code, compare the second code and the first code, and selectively authenticate the request from the first user device to access the protected resource based on a result of comparing the second code and the first code selectively grant access to the first user device to access the protected resource.

DETAILED DESCRIPTION

Figure 1A:
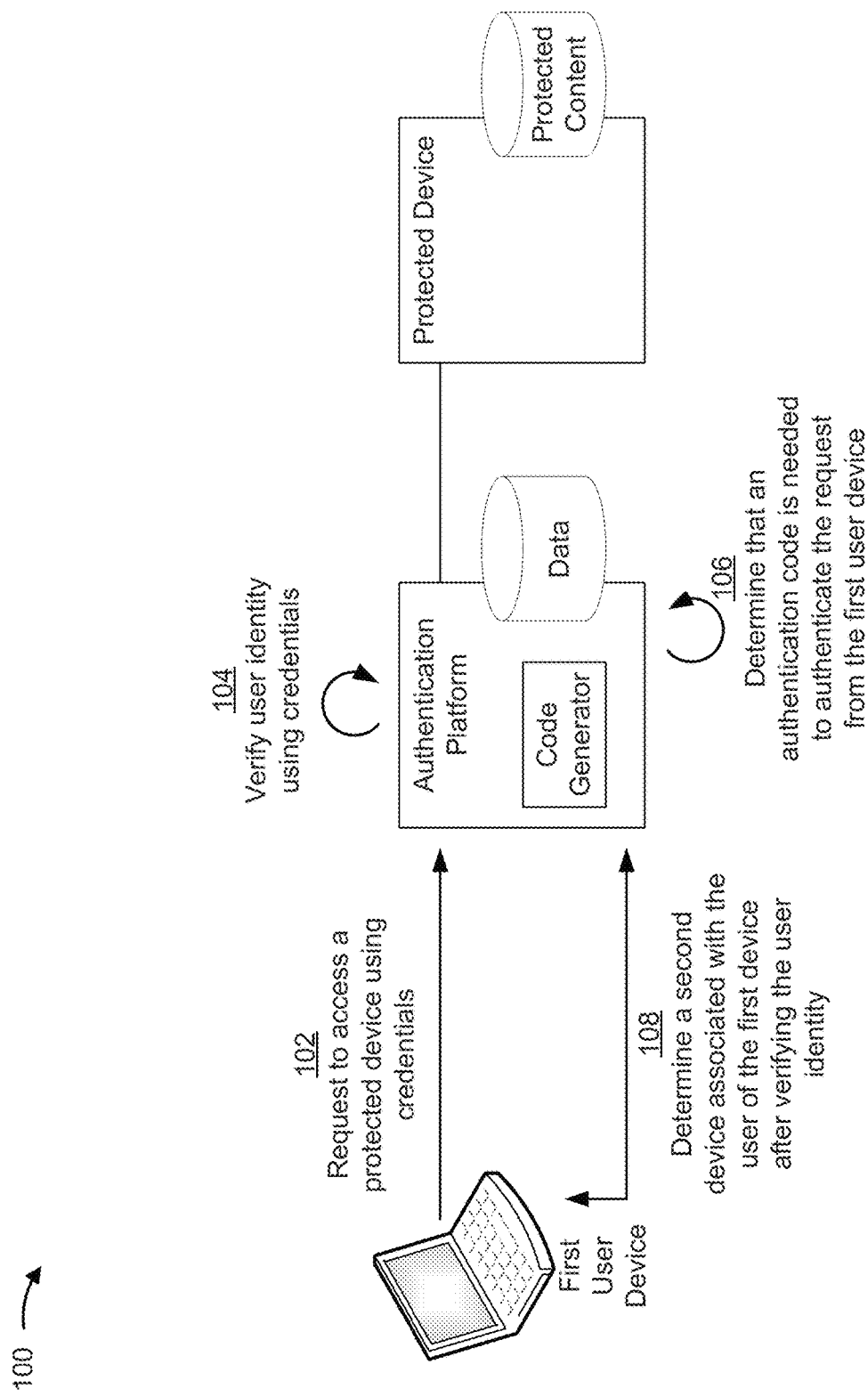
FIGS. 1A-1E are diagrams of an example implementation described herein.

The following detailed description of example implementations refers to the accompanying drawings. The same reference numbers in different drawings may identify the same or similar elements.

Authentication methods that depend on more than one factor for authentication are more difficult to compromise than single-factor methods. As a result, more and more providers of protected resources, such as financial services providers, banking providers, credit card providers, and/or the like, are requiring multi-factor authentication of a user's identity before allowing the user to gain access to the protected resource.

The user may be asked to provide a username and password as one factor for authentication. The user may be asked to provide an additional factor for authentication, which may be in the form of providing and/or correctly identifying a one-time code sent to a device (e.g., a mobile device, smartphone, computer, etc.) assumed to be in the user's possession. The one-time code, however, may be compromised in instances of the code being sent to multiple, shared devices associated with the user (e.g., a smartphone and a tablet, etc.). Additionally, since devices can be cloned, and/or a service provider's personnel may have access to read a message including the one-time code, it is no longer safe to assume that the device receiving the one-time code, and/or the message including the one-time code, is only in the user's possession.

Some implementations described herein provide an authentication platform, which may include an authentication device, configured to implement multi-factor authentication to authenticate a user identity of a user requesting access to a protected resource (e.g., access to a protected device, web access to protected content, and/or the like) before allowing the user to access the protected resource. The user, using a first user device, may request access to the protected resource and, in the request, supply certain credentials to the authentication platform. The credentials may serve as a first factor for authentication, and may include, for example, a username and password, biometric information, and/or the like.

Upon verification of the user's identity using the first factor for authentication, the authentication platform may dynamically generate a plurality of codes, one of which corresponds to a correct authentication code to be used as a second factor for authentication of the user's identity. The remaining codes in the plurality of codes may serve as decoy codes, which will prevent access to the protected resource if presented to the authentication server as the second factor for authentication. The user may be sent, at the first user device, a second user device, a third user device, etc., an instruction for identifying the correct authentication code from among the plurality of codes to be used as the second factor for authentication. The instruction may be knowledge-based (e.g., based on the user's knowledge) or otherwise require some level of discernment on behalf of the user in order to identify the correct authentication code to present to the authentication platform as the second factor for authentication. In this way, the level of security associated with performing multi-factor authentication using dynamically generated codes increases by virtue of the user having to discern the correct authentication code among the multiple decoy codes.

In some implementations, the authentication platform may additionally store the plurality of codes for comparison to an incorrect authentication code received from the user device for use in detecting potential instances of fraud or malicious attempts at obtaining access to the protected resource. For example, if the incorrect authentication code corresponds to one of the decoy codes in the plurality of codes, then a provider of the protected resource may determine or infer that the user device receiving the codes may be compromised and, thus, require the use of an additional factor for authenticating the user's identity. Further, if the incorrect authentication code does not correspond to one of the decoy codes in the plurality of codes, then the provider of the protected resource may determine or infer that the attempted authentication is an attempt by a hacker to guess the correct authentication code. In this case, further security actions may be implemented by the provider, such as, for example, locking the user out of an account to prevent access to the protected resource until a time at which the user's identity can be authenticated. In this way, the provider of the protected resource may increase the efficiency associated with assessing and/or reacting to fraudulent requests.

FIGS. 1A-1E are diagrams of an example implementation 100 described herein. As shown in FIGS. 1A-1E, example implementation 100 may include a first user device, a second user device (not shown in FIG. 1A), an authentication platform that may communicate with the first user device and the second user device, and a protected device having access to protected content or information. The authentication platform may include a code generator configured to dynamically generate authentication codes and a storage device configured to store data (e.g., profile information, the dynamically generated codes, etc.) associated with performing multi-factor authentication as described herein.

As shown in FIG. 1A, and by reference number 102, a user of the first user device may request access to the protected device. The request may be received by the authentication platform. In some implementations, the request includes credentials for use in performing multi-factor authentication by the authentication platform as described herein. The protected device may include, for example, a device containing or storing protected content, information, and/or resources, such as an ATM, a server device hosting protected content, a computer containing a data structure including protected content, a flash drive, and/or the like. In some implementations, the user of the first user device may request access to a protected resource, such as, for example, a resource disposed in a secure area (e.g., of a building, a vault, etc.), web access to a secure website, and/or the like. As an example, the user of the first user device may request access to protected content, such as money, information (e.g., identity information, financial or banking information, credit card information, health records, etc.), property (e.g., jewelry, art, etc.), and/or the like.

In some implementations, the authentication platform may be configured to authenticate a user identity of the user of the first user device that is making the request to access the protected device. For example, the authentication platform may authenticate the user identity of the user of the first user device by implementing multi-factor authentication prior to granting the user access to the protected device. In some implementations, the request to access the protected device may include credentials, which may be used as a first factor in authenticating the user's identity according to the multi-factor authentication technique or procedure employed by the authentication platform. The credentials may include, for example, a username and password, biometric information, and/or the like. As an example, the biometric information may be associated with the user of the first user device, which may include any biological trait that identifies the user, such as a fingerprint, hand geometry, retina or iris pattern, voice signature, facial pattern, and/or the like.

As further shown in FIG. 1A, and by reference number 104, the authentication platform may verify the user identity of the user of the first user device by comparing the credentials received in the request from the first user device and information contained in a user profile. In some implementations, the user profile may include information contained in a data structure accessible to the authentication platform. In some implementations, the data structure may be local or remote from the authentication platform. In some implementations, the data structure may contain information to verify the credentials, such as biometric information or the username and password, which may be compared or matched to the credentials received in the request by the authentication platform.

As further shown in FIG. 1A, and by reference number 106, the authentication platform may determine that an authentication code is needed to authenticate the request received from the first user device to access the protected device. For example, the authentication platform may determine that the authentication code is needed based on verifying the user identity of the user of the first user device. In some implementations, the authentication platform may determine that the authentication code is needed based on a lookup in a set of predefined rules or executing predefined instructions that instruct the authentication platform to perform multi-factor authentication based on at least two authentication factors, one factor including the credentials and the other factor being conditioned upon receipt of a correct authentication code.

In some implementations, the authentication platform may recognize that the first user device is a trusted device (e.g., the authentication platform has previously performed multi-factor authentication and recognizes that the user is using the first user device to provide the first factor), and the predefined rules or instructions may instruct the authentication platform to skip multi-factor authentication. In some implementations, the authentication platform may recognize that a user has disabled or turned off (e.g., using a mobile application or website) the feature requiring multi-factor authentication, and the predefined rules or instructions may instruct the authentication platform to skip multi-factor authentication when the feature has been turned off. In some implementations, the feature requiring multi-factor authentication cannot be turned off, and the authentication platform is instructed to perform multi-factor authentication each time the first user device requests access to the protected device. In some implementations, the predefined rules or instructions may instruct the authentication platform to perform multi-factor authentication even in instances where the user has turned the feature off and/or in instances where the first user device is a trusted device. For example, if the authentication platform determines that the first user device is making the request to access the protected device from an abnormal location (e.g., a geographic region or area that does not correspond to locations of where the user is typically located), then the predefined rules or instructions may instruct the authentication platform to perform multi-factor authentication to authenticate the user's identity. In some instances, the authentication platform may be aware of and/or have access to real-time (or near real-time) location information associated with the user (e.g., based on knowledge of credit card purchases, ATM usage, the user physically entering a banking branch to request a transaction, etc.) and/or the first user device (e.g., based on an application executing on the first user device), and may be instructed to perform multi-factor authentication when the user and/or the first user device is in an abnormal location compared to the location of where the user and/or the first user device are typically located or have been previously determined to be located.

In some implementations, the predefined rules or instructions may instruct the authentication platform to perform multi-factor authentication for instances in which there is at least one failed attempt at providing the first factor. For example, the predefined rules or instructions may instruct the authentication platform to perform multi-factor authentication upon incorrect entry of the username, the password, or the username and the password. In some implementations, the predefined rules or instructions may specify a time period that a user device may be considered as trusted. Upon expiration of the specified time, the authentication platform would be instructed to preform multi-factor authentication to authentication the user identity of the user of the first user device.

In some implementations, where the user attempts to access the protected device using a mobile application executing on the first user device, the application could monitor general activity on the first user device and instruct the authentication platform to perform multi-factor authentication based on this activity. For example, if an unauthorized user were to access the first user device and search around for usernames and/or passwords, then the authentication platform may determine (e.g., using the predefined rules or instructions and activity level information received from the application) to require multi-factor authentication based on increased activity. In some implementations, the user may opt-in to sharing information captured by other applications executing on the first user device (e.g., health monitoring applications, etc.). In instances where the application detects the user's heart-rate or breathing rapidly increasing, the authentication platform may determine that the user is under duress and require multi-factor authentication.

In some implementations, an authentication model may be trained and tested, using machine learning, to determine whether to perform multi-factor authentication. In this case, the authentication platform may receive, as input, any one or any combination of the above described factors when determining to perform multi-factor authentication. For example, the authentication platform may use the authentication model that receives, as input, activity level(s) associated with the user device, location information associated with the user and/or the first user device, real-time information, failed attempt information, health information, and/or the like, and calculates a risk score. When the risk-score satisfies a given threshold, the authentication platform may perform multi-factor authentication of the user's identity.

As further shown in FIG. 1A, and by reference number 108, the authentication platform may determine a second user device associated with the user of the first user device. In some implementations, the second user device may receive an authentication code for use in authenticating the user's identity according to the multi-factor authentication technique being implemented by the authentication platform. In some implementations, the authentication platform may determine a list of user devices, one of which includes the second user device, based on examining a user profile. The user profile may or may not include the same profile used to verify the user's identity based on the credentials as described herein. In some instances, the authentication platform may prompt the user of the first user device to select the second user device from a list of user devices included in the prompt and/or otherwise prompt the user to specify a method of sending the authentication code to the second user device for use in performing the multi-factor authentication of the user's identity. For example, the authentication platform may prompt the user of the first user device to select which device (e.g., a computer, laptop, tablet, mobile device, smartphone, wearable computing device, etc.) to send the authentication code to, and to select how to send the authentication code (e.g., a SMS text message, a MMS multimedia message, an electronic mail (e-mail) message, an audio message, an audio file, etc.). In this way, the user of the first user device may communicate the preferred device and method of receiving the authentication code to the authentication platform. In some implementations, the authentication code may correspond to a correct authentication code identified and/or selected from a plurality of codes as described herein.

In some implementations, the authentication platform may select which user devices, in the list of user devices, to present to the user in determining the second user device. For example, the authentication platform may determine that the user has two, three, four, etc., user devices registered with the authentication platform and that one or more of the user devices are trusted. In this case, the authentication platform may filter the list and present a list of trusted user devices to the user for use in selecting the second user device. As another example, the authentication platform may select the list of user devices to present to the user based on a location at which the user is predicted and/or determined to be. For example, if the user is predicted or determined to be at a home location (e.g., based on comparing the real-time user location and address information contained the user profile), the authentication platform may filter the list and present a list of geographically related user devices so that other user devices (e.g., a work computer, etc.) would be excluded from the list. Further, if the authentication platform determines that the user is traveling away from home, the authentication platform may exclude non-portable user devices (e.g., work computers, desktops, etc.) from the list.

Figure 1B:
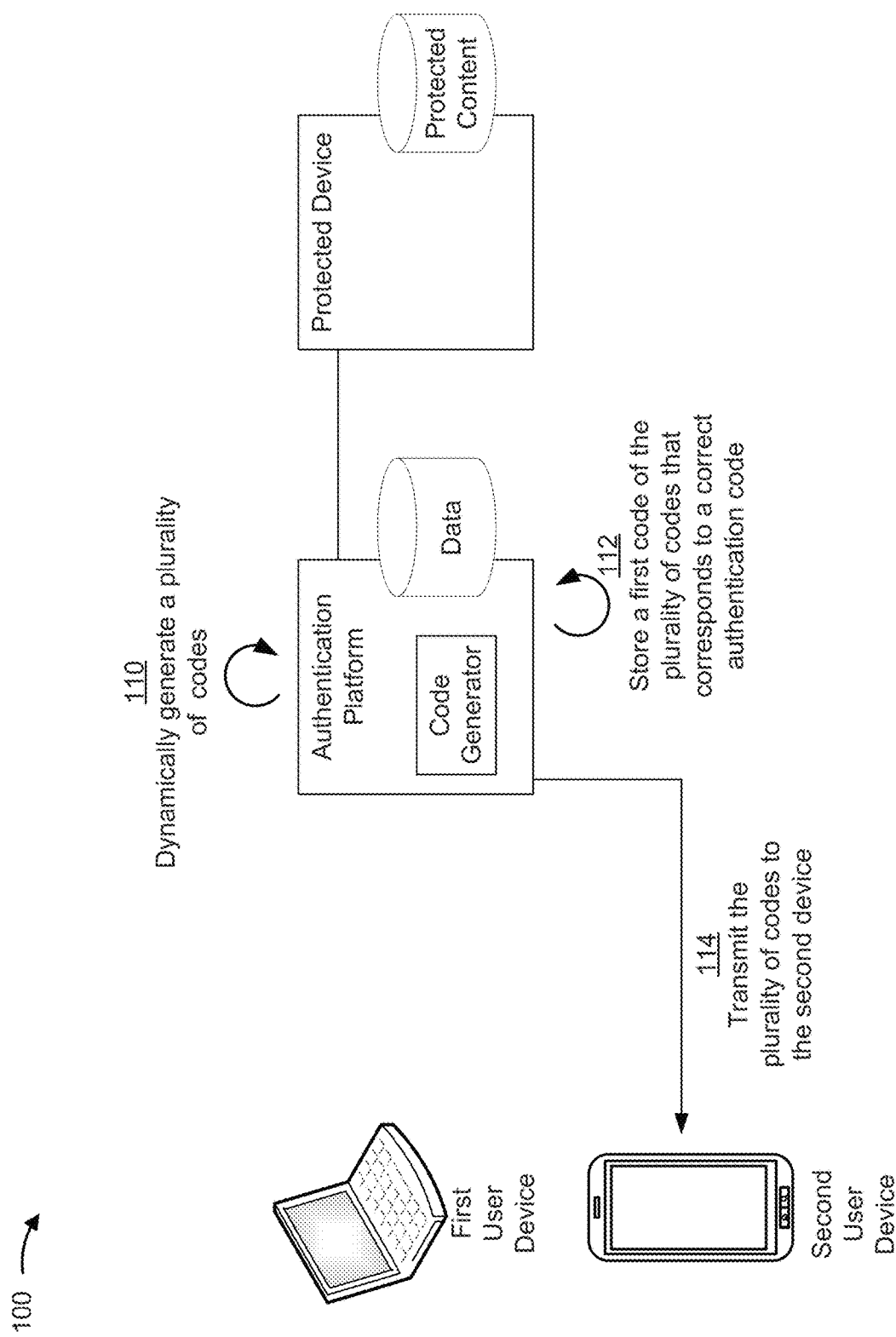

As shown in FIG. 1B, and by reference number 110, the authentication platform may generate a plurality of codes based on determining that an authentication code is needed to authenticate the request received from the first user device to access the protected device. For example, the plurality of codes may be generated by a code generator accessible to the authentication platform. In this case, the code generator may be local or remote from the authentication platform. In some implementations, a first code, of the plurality of codes, may correspond to a correct authentication code needed to authenticate the request received from the first user device to access the protected device. In this case, the remaining codes, of the plurality of codes, may correspond to decoy codes which will prevent the first user device from accessing the protected device if presented to the authentication platform.

In some implementations, the code generator may employ a pseudo-random code generator to dynamically generate a plurality of pseudo-random codes. For example, the pseudo-random codes may include numbers and/or letters. In this case, the correct authentication code and the decoy codes may each include pseudo-random codes. That is, the correct authentication code and the decoy codes may each be a pseudo-random code that is devoid of user-specific attributes. In some implementations, the code generator may access user data in creating the correct authentication code of the plurality of codes. For example, the code generator may access user-specific attributes or data and place the attributes in a randomized location (e.g., the middle, the beginning, or the end of the string of code) of the correct authentication code. Example user-specific attributes may include the user's birth day, birth month, birth year, most recent transaction value, address, zip code, area code, age, social security number (or a portion thereof), credit card number (or a portion thereof), credit score, and/or the like.

As a particular example, the user may have a birthday on January 15. In this case, the code generator may generate a correct authentication code that includes the number "15", which is an example of a user-based attribute. Example codes that the code generator may generate as the correct authentication code based on the user-based attribute "15" may include 12315, 51563, 15349, and/or the like, in which each example code includes the number "15". For codes that contain and/or are generated based on user-specific attributes, the user may be sent a knowledge-based instruction for use in determining the correct authentication code from among the plurality of codes as later described herein. In some implementations, the codes dynamically generated by the authentication platform may expire after a predetermined amount of time to increase the security level associated with the multi-factor authentication technique or process being implemented by the authentication platform.

As further shown in FIG. 1B, and by reference number 112, the authentication platform may store the first code, which corresponds to the correct authentication code, in a storage device accessible to the authentication platform for use in selectively authenticating the request from the first user device to access the protected device, as later described herein. In this case, the storage device may be local or remote from the authentication platform. In some implementations, the authentication platform may store each of the plurality of codes in the storage device accessible to the authentication platform. In this way, the authentication platform may analyze incorrect authentication codes received from user devices in an effort to potentially identify cases in which a user device is compromised and/or whether there is a malicious attempt to access the protected resource as described later herein. This may improve the security associated with performing multi-factor authentication by the authentication platform.

As further shown in FIG. 1B, and by reference number 114, the authentication platform may transmit the plurality of codes to the second user device. In some implementations, the plurality of codes may be transmitted according to the method specified by the user of the first user device. For example, the authentication platform may transmit the plurality of codes in a SMS text message, a MMS multimedia message, an e-mail message, an audio message, an audio file, and/or the like.

In some implementations, receiving the plurality of codes in an audio message and/or an audio file may be preferred in instances where the user may be hearing impaired. In some implementations, receiving the plurality of codes in an audio message and/or an audio file may be preferred in instances where the plurality of codes may be visually perceived by other, unintended recipients. For example, the authentication platform may, using location information and/or the like, determine that the user is located in a heavily populated area (e.g., a sports complex, an arena, a bus, a subway car, etc.) where a message showing visual codes (e.g. a text message, etc.) may be easily seen by others. The authentication platform may determine to send the plurality of codes as an audio message or in an audio file where the user may use headphones to listen to the plurality of codes. Sending the plurality of codes by way of an audio file may increase the security associated with sending the plurality of codes and performing multi-factor authentication based on receiving a correct authentication code, by preventing others from seeing the plurality of codes.

Figure 1C:
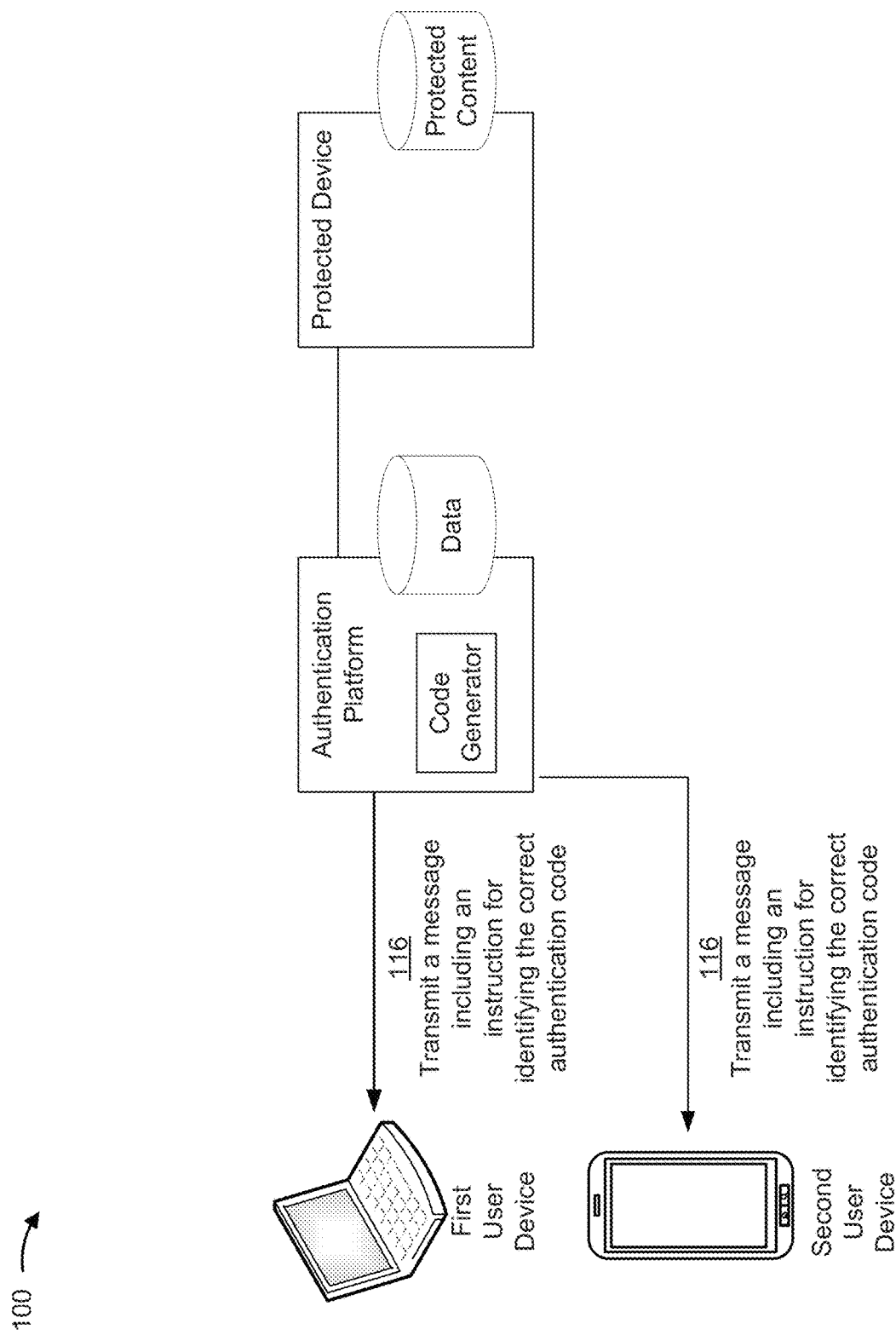

As shown in FIG. 1C, and by reference number 116, the authentication platform may transmit a message that includes an instruction for identifying the correct authentication code from among the plurality of codes sent to the second user device. The authentication platform may send the message to the first user device for display at the first user device, to the second user device for display at the second user device, to a third user device for display at the third user device, and/or the like. In some implementations, sending the message to the first user device for display at the first user device may increase the security level associated with sending the plurality of codes, as the user identity of the user of the first user device has been verified using credentials as described above. In some implementations, sending the message to the second user device for display at the second user device may increase the security level associated with sending the plurality of codes, as performing the multi-level authentication invokes the use of more than one user device. In some implementations, sending the message to a third user device, that is different from the first and second user devices, for display at the third user device may increase the security level associated with sending the plurality of codes, as performing the multi-level authentication invokes the use of more than two user devices.

In some implementations, the instruction for identifying the correct authentication code from among the plurality of codes may be a non-knowledge based instruction. For example, the instruction may instruct the user to identify the correct authentication code based on a specified order of the correct authentication code relative to other codes in the plurality of codes. As an example, the instruction may instruct the user to pick "the first code" in a list of codes, pick "the third code" in a list of codes, pick "the middle code" in a list of codes, pick "the last code" in a list of codes, and/or the like. As another example, the instruction may instruct the user to identify the correct authentication code based on the correct authentication code having a relative value compared to other codes in the plurality of codes. For example, the instruction may instruct the user to pick the code having the "lowest" value among the plurality of codes, the "highest" value from among the plurality of codes, and/or the like.

In some implementations, the instruction for identifying the correct authentication code from among the plurality of codes may be a knowledge-based instruction whereby the correct authentication code includes or contains the user-specific attribute as described above, and is determinable based on the knowledge-based instruction. For example, the instruction may instruct the user to identify the correct authentication code based on the correct authentication code containing the user's day of birth, year of birth, month of birth, age, value of their last purchase, value of their last ATM withdrawal, value of their last deposit, value of their last paycheck, and/or the like. In this case, the correct authentication code may include a specified sequence of digits compared to other codes in the plurality of codes. For example, the specified sequence of digits may correspond to the user's day of birth, year of birth, month of birth, area code, address, and/or the like. In this way, the authentication platform may instruct the user to select the correct authorization code from among the plurality of codes by selecting the code that includes the specified sequence of digits.

In some implementations, the instruction for identifying the correct authentication code from among the plurality of codes, may be transmitted from the authentication platform to the first user device, the second user device, and/or the like as a SMS text message, a pop-up message, a MMS multimedia message, an e-mail message, an audio message, an audio file, and/or the like. As an example, the instruction for identifying the correct authentication code may be transmitted to the first user device as a pop-up message instructing the user to enter the correct authentication code from the second user device, where the correct authentication code is the "lowest" number or value among the plurality of codes, the "third code" among the plurality of codes, the code including the user's birth month among the plurality of codes, and/or the like as described above. Sending the message instructing the user on how to decipher the correct authorization code from the decoy codes to the first user device may increase the security associated with performing multi-factor authentication using dynamically generated codes.

In some implementations, sending the message instructing the user on how to decipher the correct authorization code from the decoy codes in an audio message and/or an audio file may be preferred in instances where the user may be hearing impaired. In some implementations, sending the message instructing the user on how to decipher the correct authorization code from the decoy codes may be preferred in instances where the message containing the instruction may be visually perceived by other, unintended recipients. For example, the authentication platform may, using location information and/or the like, determine that the user is located in a heavily populated area, where a message that visually depicts the instruction may be accessible to others. The authentication platform may determine to send the message instructing the user on how to decipher the correct authorization code from the decoy codes as an audio message or in an audio file, where the user may use headphones to listen to the message. Sending the message instructing the user on how to decipher the correct authorization code from the decoy codes by way of an audio message or an audio file may increase the security associated with performing multi-factor authentication based on receiving a correct authentication code by preventing others from seeing the message and/or instruction for deciphering the correct code.

Figure 1D:
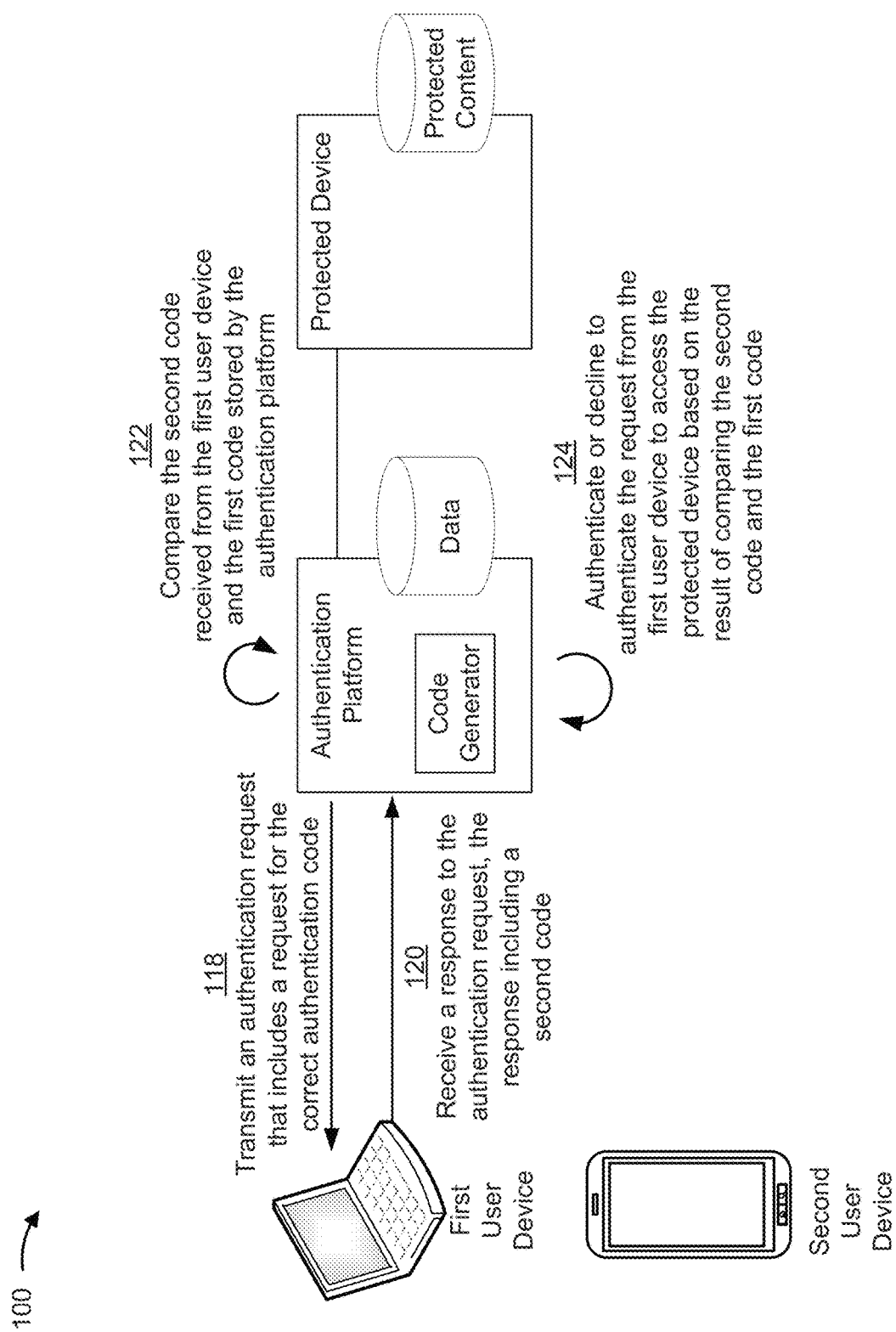

As shown in FIG. 1D, and by reference number 118, the authentication platform may transmit an authentication request to the first user device based on determining that an authentication code is needed to authenticate the request from the first user device to access the protected device. For example, the authentication request may include a request for the correct authentication code. As shown by reference number 120, the authentication platform may receive, from the first user device, a response to the authentication request that includes a second code based on the request for the correct authentication code. As shown by reference number 122, the authentication platform may compare the second code received from the first user device and the first code stored in the storage device. As noted earlier, the first code being stored in the storage device may correspond to the correct authentication code. As shown by reference number 124, the authentication platform may selectively authenticate (e.g., authenticate or decline to authenticate) the request from the first user device to access the protected device based on a result of comparing the second code and the first code, to selectively grant the first user device access to the protected device.

Figure 1E:
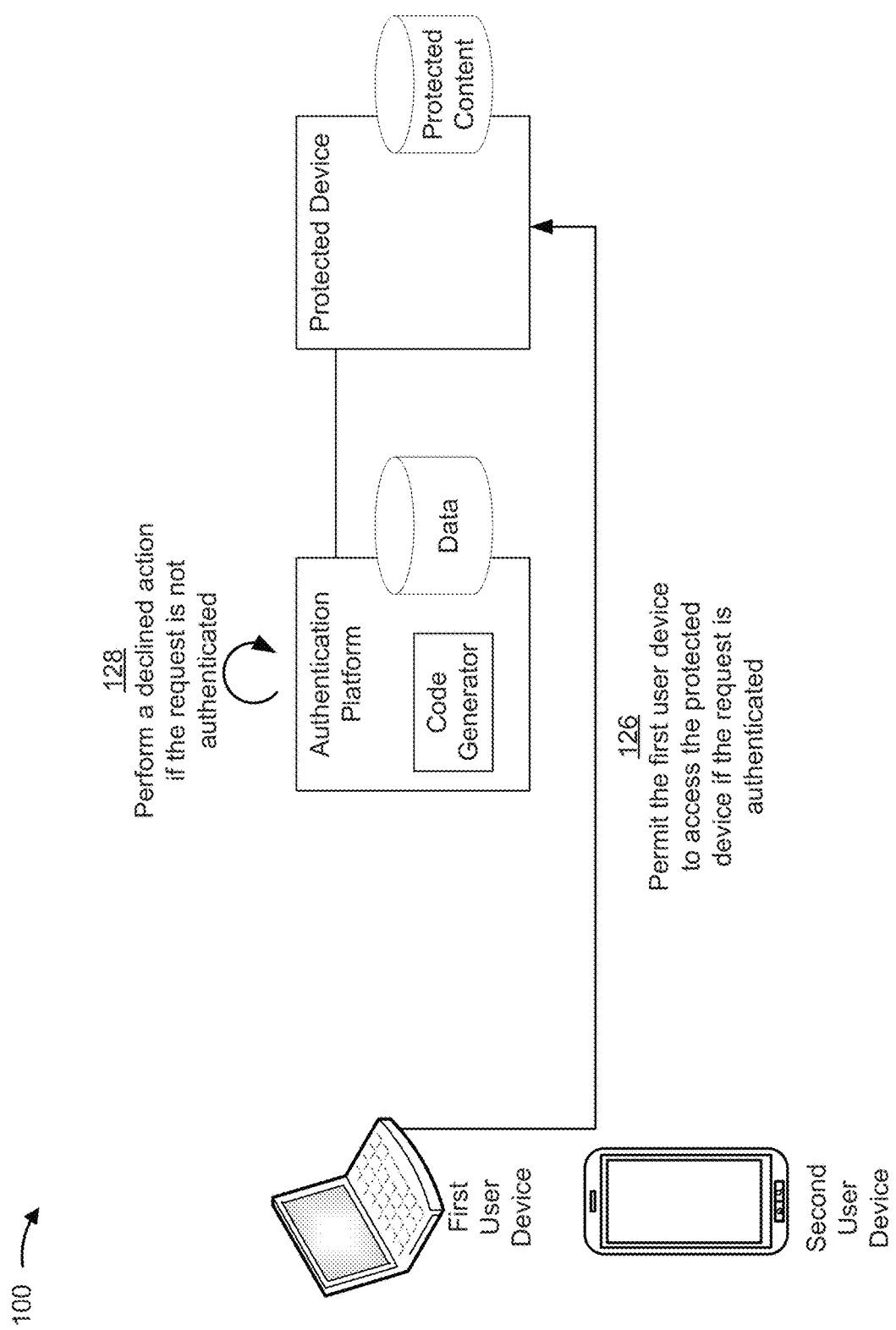

As shown in FIG. 1E, and by reference number 126, the authentication platform may permit the first user device to access the protected device if the request is authenticated (i.e., the first code matches the second code). Alternatively, as shown by reference number 128, where the second code does not match the first code, the authentication platform may perform a declined action based on declining to authenticate the request from the first user device to access the protected device. As an example, the declined action may include authenticating the request from the first user device to access the protected device by requesting the user to present a different factor for authentication. As another example, the declined action may include affording the user an additional opportunity to identify a correct authentication code based on a newly generated set of codes. As a further example, the declined action may include locking the user out of an account associated with the protected device.

In some implementations, the declined action may include analyzing the second code to try to predict or identify the reason for the failed authentication. As an example, if the second code was one of the decoy codes in the plurality of codes, then the authentication platform may inform the provider that the second user device may be compromised. As another example, if the second code was similar to the correct authentication code (e.g., one digit away from the correct authentication code, etc.), then the authentication platform may determine that the user may have incorrectly transcribed the code, and offer the user another chance at authentication. As a further example, if the second code was not one of the decoy codes, then the request to access the protected device may be labeled or identified by the authentication platform as a potential attempt by a hacker to guess the correct authentication code. In this case, further security actions may be implemented, such as locking the user out of an account to prevent access to the protected resource until the user's identity can be authenticated in a more secure method.

In this way, some implementations described herein may increase the level of security associated with performing multi-factor authentication of a user's identity using an authentication code. For example, the level of security may increase by virtue of generating and sending a user a plurality of codes (e.g., one correct authentication code and multiple decoy codes), and sending a message instructing the user how to discern the correct authentication code from among multiple decoy codes. The level of security may further increase where the correct authentication code includes a user-specific attribute. Furthermore, potential cases of fraud and/or malicious attempts at obtaining protected information from the protected device may be more quickly detected based on analyzing the incorrect authentication codes supplied to the authentication platform.

In some implementations, the authentication platform may process thousands, millions, billions, or more authentication requests, simultaneously, or within a given period of time. Considering the large number of authentication requests and information (e.g., lists of user devices, code generation, instructions to decipher the codes, etc.) used to perform multi-factor authentication of a user's identity, the generation and management of multiple codes by the authentication platform enhances the efficiency at which access to a protected device or resource is performed.

As indicated above, FIGS. 1A-1E are provided merely as an example. Other examples are possible and may differ from what was described with regard to FIGS. 1A-1E.

Figure 2:
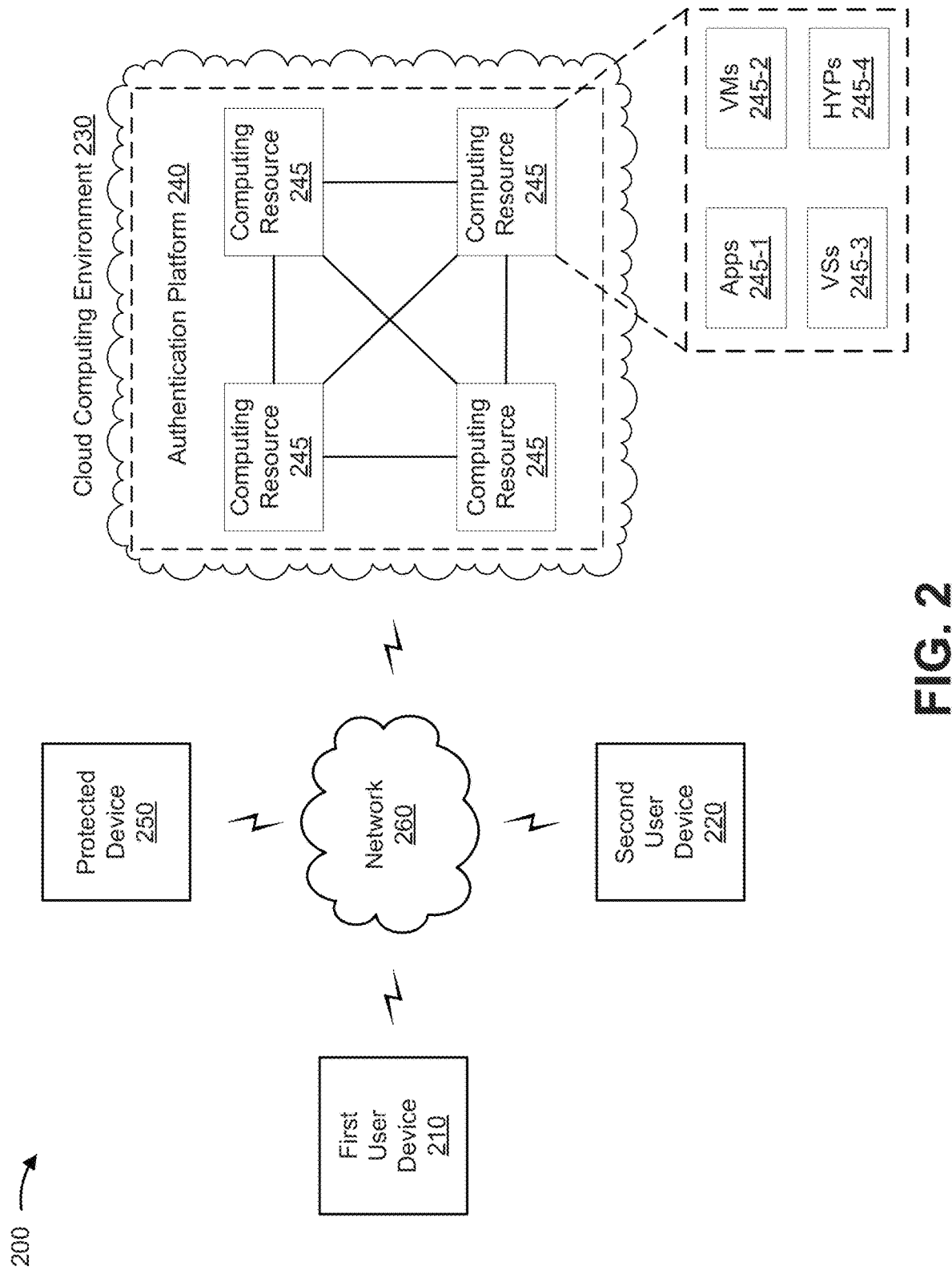
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a first user device 210, a second user device 220, a cloud computing environment 230, an authentication platform 240, a computing resource 245, a protected device 250, and a network 260. Devices of environment 200 may interconnect via wired connections, wireless connections, or a combination of wired and wireless connections.

First user device 210 includes one or more devices capable of sending, receiving, generating, storing, processing, and/or providing information associated with performing multi-factor authentication by an authentication platform (e.g., authentication platform 240). For example, first user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Second user device 220 includes one or more devices capable of sending, receiving, generating, storing, processing, and/or providing information associated with performing multi-factor authentication by the authentication platform (e.g., authentication platform 240). For example, second user device 220 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Cloud computing environment 230 includes an environment that delivers computing as a service, whereby shared resources, services, etc., may be provided to an authentication platform (e.g., authentication platform 240). Cloud computing environment 230 may provide computation, software, data access, storage, and/or other services that do not require end-user knowledge of a physical location and configuration of a system and/or a device that delivers the services. In some implementations, as shown, authentication platform 240 may be hosted in cloud computing environment 230. Notably, while implementations described herein describe authentication platform 240 as being hosted in cloud computing environment 230, in some implementations, authentication platform 240 may not be cloud-based or may be partially cloud-based.

Authentication platform 240 includes one or more devices capable of sending, receiving, processing, determining, providing, and/or otherwise performing multi-factor authentication of user identities for authenticating or declining to authenticate requests by first user device 210 to access protected device 250. Authentication platform 240 may include one or more code generator devices capable of dynamically generating codes for use in the multi-factor authentication of user identities for authenticating or declining to authenticate requests by first user device 210 to access protected device 250. In some implementations, authentication platform 240 may include a server device or a group of server devices.

Computing resource 245 includes one or more personal computers, workstation computers, server devices, or another type of computation and/or communication device. In some implementations, computing resource 245 may host authentication platform 240. The cloud resources may include compute instances executing in computing resource 245, storage devices provided in computing resource 245, data transfer devices provided by computing resource 245, etc. In some implementations, computing resource 245 may communicate with other computing resources 245 via wired connections, wireless connections, or a combination of wired and wireless connections.

As further shown in FIG. 2, computing resource 245 may include a group of cloud resources, such as one or more applications ("APPs") 245-1, one or more virtual machines ("VMs") 245-2, virtualized storage ("VSs") 245-3, one or more hypervisors ("HYPs") 245-4, or the like.

Application 245-1 includes one or more software applications that may be provided to or accessed by first user device 210, second user device 220, and/or the like. Application 245-1 may eliminate a need to install and execute the software applications on first user device 210, second user device 220, and/or the like. For example, application 245-1 may include software associated with authentication platform 240 and/or any other software capable of being provided via cloud computing environment 230. In some implementations, one application 245-1 may send/receive information to/from one or more other applications 245-1, via virtual machine 245-2.

Virtual machine 245-2 includes a software implementation of a machine (e.g., a computer) that executes programs like a physical machine. Virtual machine 245-2 may be either a system virtual machine or a process virtual machine, depending upon use and degree of correspondence to any real machine by virtual machine 245-2. A system virtual machine may provide a complete system platform that supports execution of a complete operating system ("OS"). A process virtual machine may execute a single program, and may support a single process. In some implementations, virtual machine 245-2 may execute on behalf of a user (e.g., using first user device 210, second user device 220, and/or the like), and may manage infrastructure of cloud computing environment 230, such as data management, synchronization, or long-duration data transfers.

Virtualized storage 245-3 includes one or more storage systems and/or one or more devices that use virtualization techniques within the storage systems or devices of computing resource 245. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 245-4 provides hardware virtualization techniques that allow multiple operating systems (e.g., "guest operating systems") to execute concurrently on a host computer, such as computing resource 245. Hypervisor 245-4 may present a virtual operating platform to the guest operating systems, and may manage the execution of the guest operating systems. Multiple instances of a variety of operating systems may share virtualized hardware resources.

Protected device 250 includes one or more devices capable of sending, receiving, storing, providing, hosting, processing, and/or facilitating provision of a protected resource or content to a user accessing a user device (e.g., first user device 210). For example, protected device 250 may include one or more servers and/or computers configured to store and/or provide protected resources, content, or information associated with the user of the user device (e.g., first user device 210). Upon authentication of the identity of the user of the user device (e.g., first user device 210) by authentication platform 240, the user may access protected device 250.

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
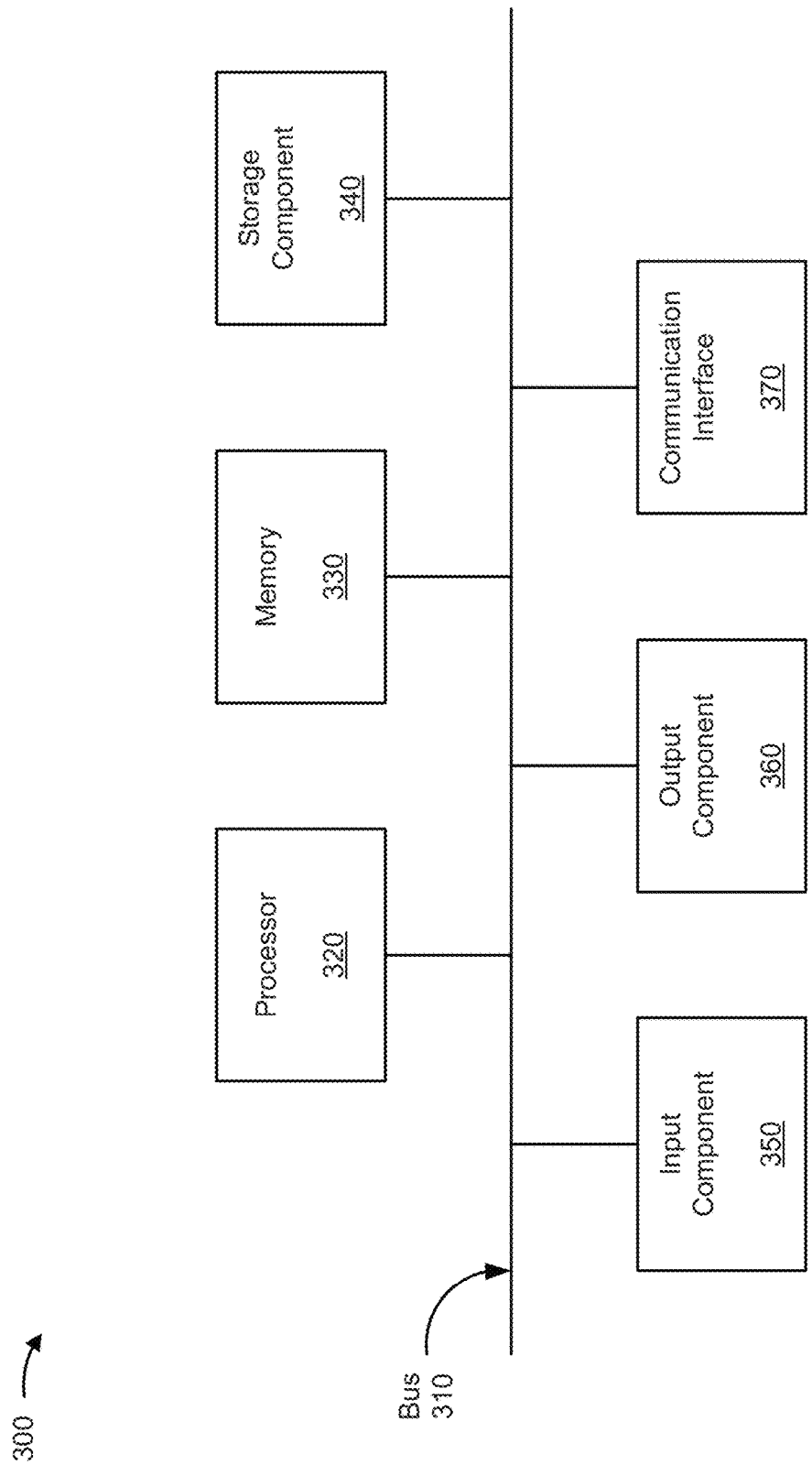
FIG. 3 is a diagram of example components of one or more devices of FIG. 2.

FIG. 3 is a diagram of example components of a device 300. Device 300 may correspond to first user device 210, second user device 220, authentication platform 240, computing resource 245, and/or protected device 250. In some implementations, first user device 210, second user device 220, authentication platform 240, computing resource 245, and/or protected device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes one or more memories such as a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
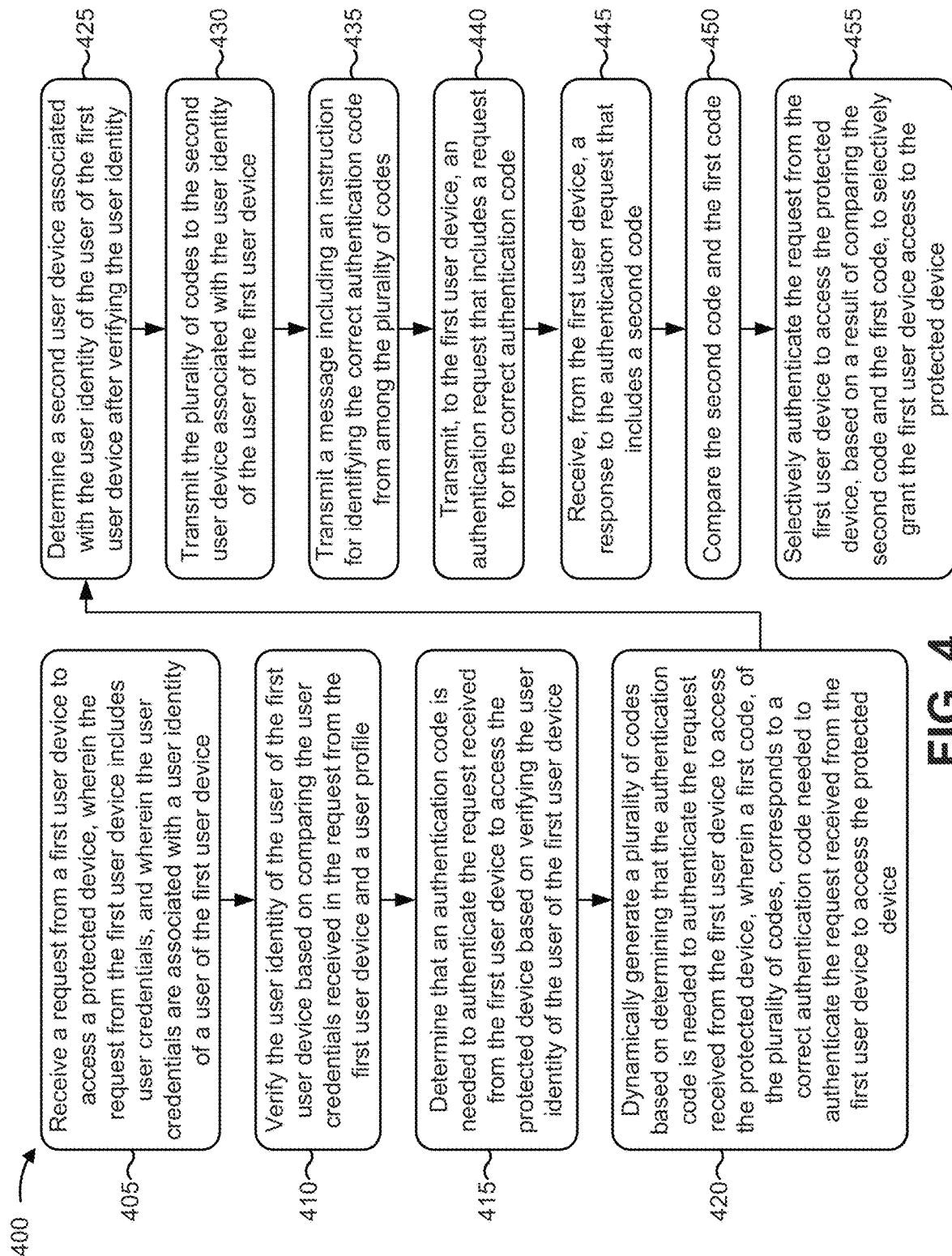
FIG. 4 is a flow chart of an example process for performing multi-factor authentication.

FIG. 4 is a flow chart of an example process 400 for performing multi-factor authentication. In some implementations, one or more process blocks of FIG. 4 may be performed by an authentication platform (e.g., authentication platform 240). In some implementations, one or more process blocks of FIG. 4 may be performed by another device or a group of devices separate from or including the authentication platform, such as a first user device (e.g., first user device 210), a second user device (e.g., second user device 220), and/or a protected device (e.g., protected device 250).

As shown in FIG. 4, process 400 may include receiving a request from a first user device to access a protected device, wherein the request from the first user device includes user credentials, and wherein the user credentials are associated with a user identity of a user of the first user device (block 405). For example, an authentication platform (e.g., authentication platform 240, using computing resource 245, processor 320, memory 330, storage component 340, input component 350, communication interface 370, and/or the like) may receive a request from a first user device to access a protected device, as described above in connection with FIGS. 1A-1E. In some implementations, the request from the first user device may include user credentials. In some implementations, the user credentials may be associated with a user identity of a user of the first user device.

As further shown in FIG. 4, process 400 may include verifying the user identity of the user of the first user device based on comparing the user credentials received in the request from the first user device and a user profile (block 410). For example, the authentication platform (e.g., authentication platform 240, using computing resource 245, processor 320, memory 330, storage component 340, communication interface 370, and/or the like) may verify the user identity of the user of the first user device based on comparing the user credentials received in the request from the first user device and a user profile, as described above in connection with FIGS. 1A-1E.

As further shown in FIG. 4, process 400 may include determining that an authentication code is needed to authenticate the request received from the first user device to access the protected device based on verifying the user identity of the user of the first user device (block 415). For example, the authentication platform (e.g., authentication platform 240, using computing resource 245, processor 320, memory 330, storage component 340, and/or the like) may determine that an authentication code is needed to authenticate the request received from the first user device to access the protected device based on verifying the user identity of the user of the first user device, as described above in connection with FIGS. 1A-1E.

As further shown in FIG. 4, process 400 may include dynamically generating a plurality of codes based on determining that the authentication code is needed to authenticate the request received from the first user device to access the protected device, wherein a first code, of the plurality of codes, corresponds to a correct authentication code needed to authenticate the request received from the first user device to access the protected device (block 420). For example, the authentication platform (e.g., authentication platform 240, using computing resource 245, processor 320, memory 330, storage component 340, and/or the like) may dynamically generate a plurality of codes based on determining that the authentication code is needed to authenticate the request received from the first user device to access the protected device, as described above in connection with FIGS. 1A-1E. In some implementations, a first code, of the plurality of codes, may correspond to a correct authentication code needed to authenticate the request received from the first user device to access the protected device.

As further shown in FIG. 4, process 400 may include determining a second user device associated with the user identity of the user of the first user device after verifying the user identity (block 425). For example, the authentication platform (e.g., authentication platform, using computing resource 245, processor 320, memory 330, storage component 340, communication interface 370, and/or the like) may determine a second user device associated with the user identity of the user of the first user device after verifying the user identity, as described above in connection with FIGS. 1A-1E.

As further shown in FIG. 4, process 400 may include transmitting the plurality of codes to the second user device associated with the user identity of the user of the first user device (block 430). For example, the authentication platform (e.g., authentication platform 240, using computing resource 245, processor 320, memory 330, storage component 340, output component 360, communication interface 370, and/or the like) may transmit the plurality of codes to the second user device associated with the user identity of the user of the first user device, as described above in connection with FIGS. 1A-1E.

As further shown in FIG. 4, process 400 may include transmitting a message including an instruction for identifying the correct authentication code from among the plurality of codes (block 435). For example, the authentication platform (e.g., authentication platform 240, using computing resource 245, processor 320, memory 330, storage component 340, communication interface 370, output component 360, and/or the like) may transmit a message including an instruction for identifying the correct authentication code from among the plurality of codes, as described above in connection with FIGS. 1A-1E.

As further shown in FIG. 4, process 400 may include transmitting, to the first user device, an authentication request that includes a request for the correct authentication code (block 440). For example, the authentication platform (e.g., authentication platform 240, using computing resource 245, processor 320, memory 330, storage component 340, output component 360, communication interface 370, and/or the like) may transmit, to the first user device, an authentication request that includes a request for the correct authentication code, as described above in connection with FIGS. 1A-1E.

As further shown in FIG. 4, process 400 may include receiving, from the first user device, a response to the authentication request that includes a second code (block 445). For example, the authentication platform (e.g., authentication platform 240, using computing resource 245, processor 320, memory 330, storage component 340, input component 350, communication interface 370, and/or the like) may receive, from the first user device, a response to the authentication request that includes a second code, as described above in connection with FIGS. 1A-1E.

As further shown in FIG. 4, process 400 may include comparing the second code and the first code (block 450). For example, the authentication platform (e.g., authentication platform 240, using computing resource 245, processor 320, memory 330, storage component 340, and/or the like) may compare the second code and the first code, as described above in connection with FIGS. 1A-1E.

As further shown in FIG. 4, process 400 may include selectively authenticating the request from the first user device to access the protected device, based on a result of comparing the second code and the first code, to selectively grant the first user device access to the protected device (block 455). For example, the authentication platform (e.g., authentication platform 240, using computing resource 245, processor 320, memory 330, storage component 340, output component 360, communication interface 370, and/or the like) may selectively authenticate the request from the first user device to access the protected device, based on a result of comparing the second code and the first code, to selectively grant the first user device access to the protected device, as described above in connection with FIGS. 1A-1E.

Process 400 may include additional implementations, such as any single implementation or any combination of implementations described below and/or in connection with one or more other processes described elsewhere herein.

In some implementations, the second code may correspond to one of the plurality of codes transmitted to the second user device. In some implementations, the message, including the instruction for identifying the correct authentication code from among the plurality of codes, may be transmitted to the first user device for display by the first user device. In some implementations, the message, including the instruction for identifying the correct authentication code from among the plurality of codes, may include a first instruction that identifies the correct authentication code as having a specified order relative to other codes in the plurality of codes, a second instruction that identifies the correct authentication code as having a relative value compared to other codes in the plurality of codes, and/or a third instruction that identifies the correct authentication code as having a specified sequence of digits compared to other codes in the plurality of codes. In some implementations, the message, including the instruction for identifying the correct authentication code from among the plurality of codes, may include a text message, a pop-up message, a multimedia message, an electronic mail message, and/or an audio message.

In some implementations, the instruction, for identifying the correct authentication code from among the plurality of codes, may be transmitted to the second user device for display by the second user device. In some implementations, the instruction, for identifying the correct authentication code from among the plurality of codes, may include a knowledge-based instruction whereby the correct authentication code includes a user-specific attribute determinable based on the knowledge-based instruction. In some implementations, process 400 may further include storing the plurality of codes in a storage device. In some implementations, process 400 may further include comparing the second code, received in the response to the authentication request from the first user device, and the plurality of codes stored in the storage device to detect a malicious attempt to access the protected device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
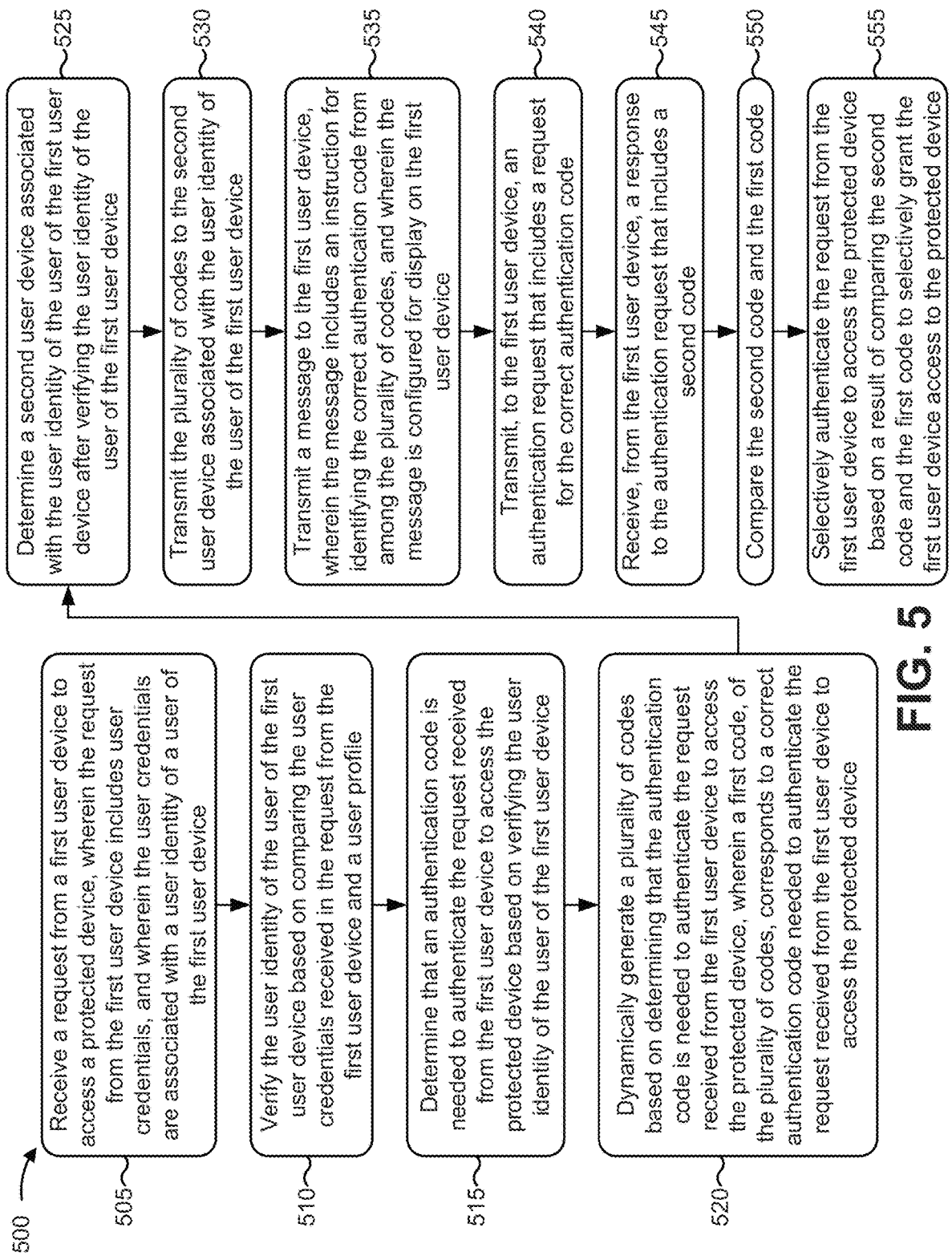
FIG. 5 is a flow chart of an example process for performing multi-factor authentication.

FIG. 5 is a flow chart of an example process 500 for performing multi-factor authentication. In some implementations, one or more process blocks of FIG. 5 may be performed by an authentication platform (e.g., authentication platform 240). In some implementations, one or more process blocks of FIG. 5 may be performed by another device or a group of devices separate from or including the authentication platform, such as a first user device (e.g., first user device 210), a second user device (e.g., second user device 220), a computing resource (e.g., computing resource 245), and/or a protected device (e.g., protected device 250).

As shown in FIG. 5, process 500 may include receiving a request from a first user device to access a protected device, wherein the request from the first user device includes user credentials, and wherein the user credentials are associated with a user identity of a user of the first user device (block 505). For example, the authentication platform (e.g., authentication platform 240, using computing resource 245, processor 320, memory 330, storage component 340, input component 350, communication interface 370, and/or the like) may receive a request from a first user device to access a protected device, as described above in connection with FIGS. 1A-1E. In some implementations, the request from the first user device may include user credentials. In some implementations, the user credentials may be associated with a user identity of a user of the first user device.

As further shown in FIG. 5, process 500 may include verifying the user identity of the user of the first user device based on comparing the user credentials received in the request from the first user device and a user profile (block 510). For example, the authentication platform (e.g., authentication platform 240, using computing resource 245, processor 320, memory 330, storage component 340, communication interface 370, and/or the like) may verify the user identity of the user of the first user device based on comparing the user credentials received in the request from the first user device and a user profile, as described above in connection with FIGS. 1A-1E.

As further shown in FIG. 5, process 500 may include determining that an authentication code is needed to authenticate the request received from the first user device to access the protected device based on verifying the user identity of the user of the first user device (block 515). For example, the authentication platform device (e.g., authentication platform 240, using computing resource 245, processor 320, memory 330, storage component 340, communication interface 370, and/or the like) may determine that an authentication code is needed to authenticate the request received from the first user device to access the protected device based on verifying the user identity of the user of the first user device, as described above in connection with FIGS. 1A-1E.

As further shown in FIG. 5, process 500 may include dynamically generating a plurality of codes based on determining that the authentication code is needed to authenticate the request received from the first user device to access the protected device, wherein a first code, of the plurality of codes, corresponds to a correct authentication code needed to authenticate the request received from the first user device to access the protected device (block 520). For example, the authentication platform (e.g., authentication platform 240, using computing resource 245, processor 320, memory 330, storage component 340, and/or the like) may dynamically generate a plurality of codes based on determining that the authentication code is needed to authenticate the request received from the first user device to access the protected device, as described above in connection with FIGS. 1A-1E. In some implementations, a first code, of the plurality of codes, may correspond to a correct authentication code needed to authenticate the request received from the first user device to access the protected device.

As further shown in FIG. 5, process 500 may include determining a second user device associated with the user identity of the user of the first user device after verifying the user identity of the user of the first user device (block 525). For example, the authentication platform (e.g., authentication platform 240, using computing resource 245, processor 320, memory 330, storage component 340, communication interface 370, and/or the like) may determine a second user device associated with the user identity of the user of the first user device after verifying the user identity of the user of the first user device, as described above in connection with FIGS. 1A-1E.

As further shown in FIG. 5, process 500 may include transmitting the plurality of codes to the second user device associated with the user identity of the user of the first user device (block 530). For example, the authentication platform (e.g., authentication platform 240, using computing resource 245, processor 320, memory 330, storage component 340, output component 360, communication interface 370, and/or the like) may transmit the plurality of codes to the second user device associated with the user identity of the user of the first user device, as described above in connection with FIGS. 1A-1E.

As further shown in FIG. 5, process 500 may include transmitting a message to the first user device, wherein the message includes an instruction for identifying the correct authentication code from among the plurality of codes, and wherein the message is configured for display on the first user device (block 535). For example, the authentication platform (e.g., authentication platform 240, using computing resource 245, processor 320, memory 330, storage component 340, output component 360, communication interface 370, and/or the like) may transmit a message to the first user device, as described above in connection with FIGS. 1A-1E. In some implementations, the message may include an instruction for identifying the correct authentication code from among the plurality of codes. In some implementations, the message may be configured for display on the first user device.

As further shown in FIG. 5, process 500 may include transmitting, to the first user device, an authentication request that includes a request for the correct authentication code (block 540). For example, the authentication platform (e.g., authentication platform 240, using computing resource 245, processor 320, memory 330, storage component 340, output component 360, communication interface 370, and/or the like) may transmit, to the first user device, an authentication request that includes a request for the correct authentication code, as described above in connection with FIGS. 1A-1E.

As further shown in FIG. 5, process 500 may include receiving, from the first user device, a response to the authentication request that includes a second code (block 545). For example, the authentication platform device (e.g., using computing resource 245, processor 320, memory 330, storage component 340, input component 350, communication interface 370, and/or the like) may receive, from the first user device, a response to the authentication request that includes a second code, as described above in connection with FIGS. 1A-1E.

As further shown in FIG. 5, process 500 may include comparing the second code and the first code (block 550). For example, the authentication platform device (e.g., using computing resource 245, processor 320, memory 330, storage component 340, and/or the like) may compare the second code and the first code, as described above in connection with FIGS. 1A-1E.

As further shown in FIG. 5, process 500 may include selectively authenticating the request from the first user device to access the protected device based on a result of comparing the second code and the first code to selectively grant the first user device access to the protected device (block 555). For example, the authentication platform (e.g., authentication platform 240, using computing resource 245, processor 320, memory 330, storage component 340, communication interface 370, and/or the like) may selectively authenticate the request from the first user device to access the protected device based on a result of comparing the second code and the first code to selectively grant the first user device access to the protected device, as described above in connection with FIGS. 1A-1E.

Process 500 may include additional implementations, such as any single implementation or any combination of implementations described below and/or in connection with one or more other processes described elsewhere herein.

In some implementations, the instruction, for identifying the correct authentication code from among the plurality of codes, may include a first instruction that identifies the correct authentication code as having a specified order relative to other codes in the plurality of codes, a second instruction that identifies the correct authentication code as having a relative value compared to other codes in the plurality of codes, and/or a third instruction that identifies the correct authentication code as having a specified sequence of digits compared to other codes in the plurality of codes. In some implementations, the instruction, for identifying the correct authentication code from among the plurality of codes, may include a knowledge-based instruction whereby the correct authentication code includes a user-specific attribute determinable based on the knowledge-based instruction. In some implementations, the message, including the instruction for identifying the correct authentication code from among the plurality of codes, may include a text message, a pop-up message, a multimedia message, an electronic mail message, or an audio message. In some implementations, the device may include a storage device. In some implementations, the plurality of codes may be stored in the storage device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
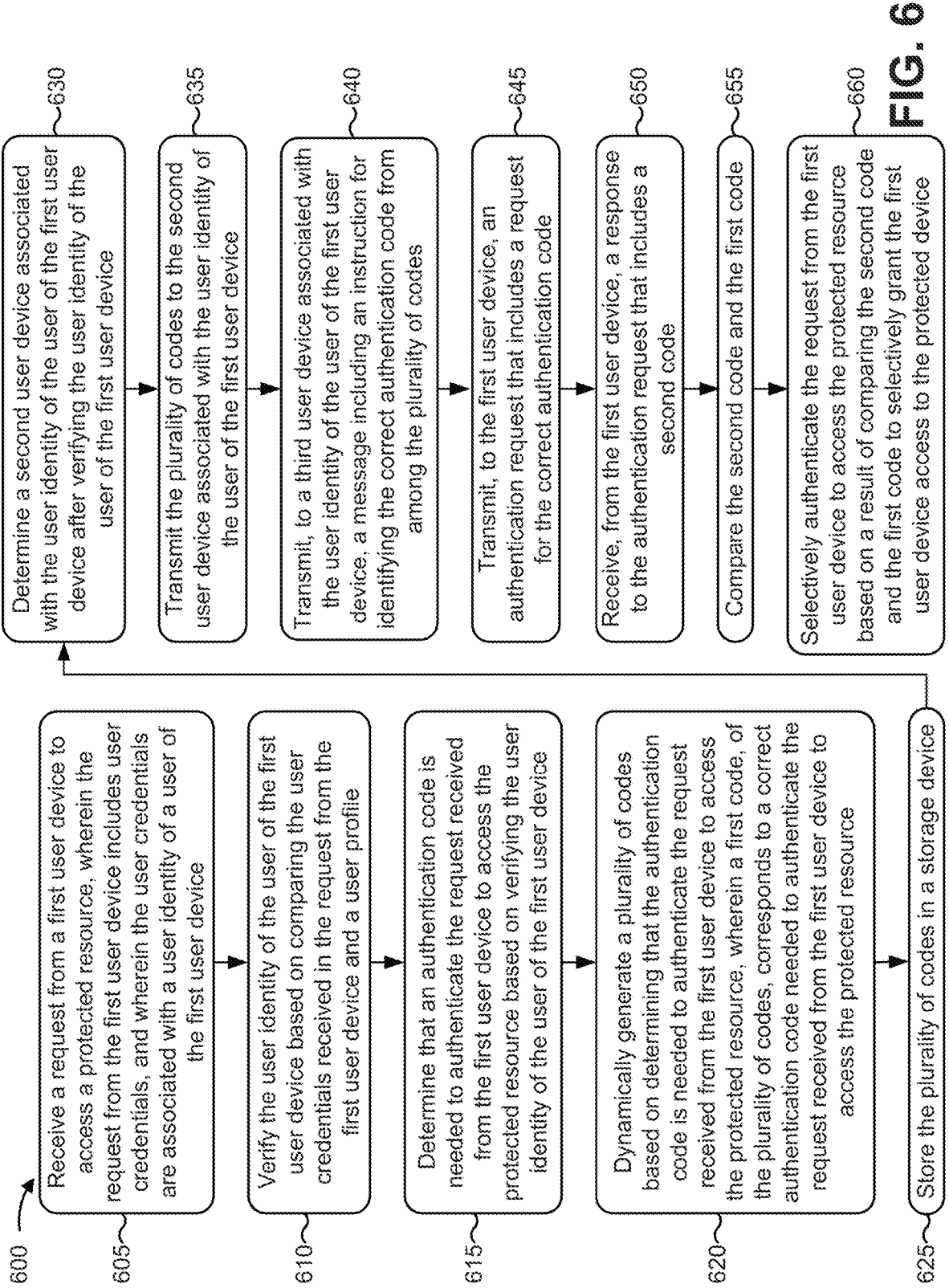
FIG. 6 is a flow chart of an example process for performing multi-factor authentication.

FIG. 6 is a flow chart of an example process 600 for performing multi-factor authentication. In some implementations, one or more process blocks of FIG. 6 may be performed by an authentication platform (e.g., authentication platform 240). In some implementations, one or more process blocks of FIG. 6 may be performed by another device or a group of devices separate from or including the authentication platform (e.g., authentication platform 240), such as a first user device (e.g., first user device 210), a second user device (e.g., second user device 220), a computing resource (e.g., computing resource 245), and/or a protected device (e.g., protected device 250).

As shown in FIG. 6, process 600 may include receiving a request from a first user device to access a protected device, wherein the request from the first user device includes user credentials, and wherein the user credentials are associated with a user identity of a user of the first user device (block 605). For example, the authentication platform (e.g., authentication platform 240, using computing resource 245, processor 320, memory 330, storage component 340, input component 350, communication interface 370, and/or the like) may receive a request from a first user device to access a protected resource, as described above in connection with FIGS. 1A-1E. In some implementations, the request from the first user device may include user credentials. In some implementations, the user credentials may be associated with a user identity of a user of the first user device.

As further shown in FIG. 6, process 600 may include verifying the user identity of the user of the first user device based on comparing the user credentials received in the request from the first user device and a user profile (block 610). For example, the authentication platform (e.g., authentication platform 240, using computing resource 245, processor 320, memory 330, storage component 340, communication interface 370, and/or the like) may verify the user identity of the user of the first user device based on comparing the user credentials received in the request from the first user device and a user profile, as described above in connection with FIGS. 1A-1E.

As further shown in FIG. 6, process 600 may include determining that an authentication code is needed to authenticate the request received from the first user device to access the protected device based on verifying the user identity of the user of the first user device (block 615). For example, the authentication platform (e.g., authentication platform 240, using computing resource 245, processor 320, memory 330, storage component 340, communication interface 370, and/or the like) may determine that an authentication code is needed to authenticate the request received from the first user device to access the protected resource based on verifying the user identity of the user of the first user device, as described above in connection with FIGS. 1A-1E.

As further shown in FIG. 6, process 600 may include dynamically generating a plurality of codes based on determining that the authentication code is needed to authenticate the request received from the first user device to access the protected device, wherein a first code, of the plurality of codes, corresponds to a correct authentication code needed to authenticate the request received from the first user device to access the protected device (block 620). For example, the authentication platform (e.g., authentication platform 240, using computing resource 245, processor 320, memory 330, storage component 340, communication interface 370, and/or the like) may dynamically generate a plurality of codes based on determining that the authentication code is needed to authenticate the request received from the first user device to access the protected resource, as described above in connection with FIGS. 1A-1E. In some implementations, a first code, of the plurality of codes, may correspond to a correct authentication code needed to authenticate the request received from the first user device to access the protected resource.

As further shown in FIG. 6, process 600 may include storing the plurality of codes in a storage device (block 625). For example, the authentication platform (e.g., authentication platform 240, using computing resource 245, processor 320, memory 330, storage component 340, and/or the like) may store the plurality of codes in a storage device, as described above in connection with FIGS. 1A-1E.

As further shown in FIG. 6, process 600 may include determining a second user device associated with the user identity of the user of the first user device after verifying the user identity of the user of the first user device (block 630). For example, the authentication platform (e.g., authentication platform 240, using computing resource 245, processor 320, memory 330, storage component 340, communication interface 370, and/or the like) may determine a second user device associated with the user identity of the user of the first user device after verifying the user identity of the user of the first user device, as described above in connection with FIGS. 1A-1E.

As further shown in FIG. 6, process 600 may include transmitting the plurality of codes to the second user device associated with the user identity of the user of the first user device (block 635). For example, the authentication platform (e.g., authentication platform 240, using computing resource 245, processor 320, memory 330, storage component 340, output component 360, communication interface 370, and/or the like) may transmit the plurality of codes to the second user device associated with the user identity of the user of the first user device, as described above in connection with FIGS. 1A-1E.

As further shown in FIG. 6, process 600 may include transmitting, to a third user device associated with the user identity of the user of the first user device, a message including an instruction for identifying the correct authentication code from among the plurality of codes (block 640). For example, the authentication platform (e.g., authentication platform 240, using computing resource 245, processor 320, memory 330, storage component 340, output component 360, communication interface 370, and/or the like) may transmit, to a third user device associated with the user identity of the user of the first user device, a message including an instruction for identifying the correct authentication code from among the plurality of codes, as described above in connection with FIGS. 1A-1E.

As further shown in FIG. 6, process 600 may include transmitting, to the first user device, an authentication request that includes a request for the correct authentication code (block 645). For example, the authentication platform (e.g., authentication platform 240, using computing resource 245, processor 320, memory 330, storage component 340, output component 360, communication interface 370, and/or the like) may transmit, to the first user device, an authentication request that includes a request for the correct authentication code, as described above in connection with FIGS. 1A-1E.

As further shown in FIG. 6, process 600 may include receiving, from the first user device, a response to the authentication request that includes a second code (block 650). For example, the authentication platform (e.g., authentication platform 240, using computing resource 245, processor 320, memory 330, storage component 340, input component 350, communication interface 370, and/or the like) may receive, from the first user device, a response to the authentication request that includes a second code, as described above in connection with FIGS. 1A-1E.

As further shown in FIG. 6, process 600 may include comparing the second code and the first code (block 655). For example, the authentication platform (e.g., authentication platform 240, using computing resource 245, processor 320, memory 330, storage component 340, communication interface 370, and/or the like) may compare the second code and the first code, as described above in connection with FIGS. 1A-1E.

As further shown in FIG. 6, process 600 may include selectively authenticating the request from the first user device to access the protected device based on a result of comparing the second code and the first code to selectively grant the first user device access to the protected device (block 660). For example, the authentication platform device (e.g., authentication platform 240, using computing resource 245, processor 320, memory 330, storage component 340, communication interface 370, and/or the like) may selectively authenticate the request from the first user device to access the protected resource based on a result of comparing the second code and the first code selectively grant access to the first user device to access the protected resource, as described above in connection with FIGS. 1A-1E.

Process 600 may include additional implementations, such as any single implementation or any combination of implementations described below and/or in connection with one or more other processes described elsewhere herein.

In some implementations, process 600 may further include generating the instruction for identifying the correct authentication code from among the plurality of codes. In some implementations, the instruction may include a first instruction that indicates the correct authentication code as having a specified order relative to other codes in the plurality of codes, a second instruction that indicates the correct authentication code as having a relative value compared to other codes in the plurality of codes, and/or a third instruction that indicates the correct authentication code as having a specified sequence of digits compared to other codes in the plurality of codes. In some implementations, the instruction may include a knowledge-based instruction whereby the correct authentication code includes a user-specific attribute to be determined based on the knowledge-based instruction.

In some implementations, process 600 may further include transmitting the message, including the instruction for identifying the correct authentication code from among the plurality of codes, as a text message, a pop-up message, a multimedia message, an electronic mail message, or an audio message. In some implementations, the third user device may be the first user device. In some implementations, process 600 may further include declining to authenticate the request from the first user device to access the protected resource, and analyzing the second code received in the response to the authentication request from the first user device by comparing the second code to the plurality of codes stored in the storage device to detect a malicious attempt to access the protected resource Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, the level of security for performing multi-factor authentication is increased by generating a plurality of codes and instructing the user to deciphering the correct authentication code from the plurality of codes. Further, potential cases of fraud or malicious attempts at obtaining protected information may be more quickly detected based on analyzing the incorrect authentication codes supplied to the authentication platform. As an example, if the code was one of the incorrect decoy codes, then the user device receiving the codes may be compromised. As another example, if the incorrect authentication code was one digit away from the correct authentication code, then the user may have incorrectly transcribed the code, and may be offered another chance at authentication. As another example, if the incorrect authentication code was not one of the incorrect decoy codes, it may be identified as an attempt by a hacker to guess the correct authentication code. In this case, further security actions may be implemented, such as locking the user out of an account to prevent access to the protected resource until the user's identity can be authenticated in a more secure way.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Further, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Further, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   determining, by a processor and based on receiving a request from a first device to access a second device, that an authentication code is needed to authenticate the request;
   generating, by the processor and based on determining that the authentication code is needed to authenticate the request, a plurality of codes that include:
      a first code corresponding to a correct authentication code needed to authenticate the request, and
      one or more second codes corresponding to one or more decoy codes;
   transmitting the plurality of codes to a third device;
   transmitting a message including an instruction for identifying the correct authentication code from the plurality of codes using user-specific data;
   comparing, by the processor, a third code received from the first device and the plurality of codes,
      wherein the third code is received based on the message; and
   authenticating or declining, by the processor and based on comparing the third code and the plurality of codes, the request.

2. The method of claim 1, further comprising:
   transmitting an authentication request that includes a request for the correct authentication code; and
   receiving a response to the authentication request that includes the third code.

3. The method of claim 1, wherein the request is authenticated based on the third code matching the first code.

4. The method of claim 1, further comprising:
   determining, based on the third code matching the one or more second codes, that the third device is compromised, and requesting, based on determining that the third device is compromised, an additional factor for authenticating the request; or performing, based on the third code not matching the first code and based on the third code not matching the one or more second codes, a security action.

5. The method of claim 1, wherein the plurality of codes are transmitted according to a communication of the first device, wherein the communication includes at least one of:
a text message,
a multimedia message,
an e-mail message, or
an audio message.

6. The method of claim 1, wherein the first code is generated using a pseudo-random code.

7. The method of claim 1, wherein the instruction includes information identifying a position, associated with the first code, relative to the one or more second codes in a list the one or more second codes.

8. A device, comprising:
one or more memories; and
one or more processors, communicatively coupled to the one or more memories, configured to:
determine, based on receiving a request from a first device to access a second device, that an authentication code is needed to authenticate the request;
generate, based on determining that the authentication code is needed to authenticate the request, a plurality of codes that include:
a first code corresponding to a correct authentication code needed to authenticate the request, and
one or more second codes corresponding to one or more decoy codes;
transmit the plurality of codes to a third device;
transmit a message including an instruction for identifying the correct authentication code from the plurality of codes using user-specific data;
compare a third code received from the first device and the plurality of codes,
wherein the third code is received based on the message; and
authenticate or decline, based on comparing the third code and the plurality of codes, the request.

9. The device of claim 8, wherein the one or more processors are further configured to:
transmit an authentication request that includes a request for the correct authentication code; and
receive a response to the authentication request that includes the third code.

10. The device of claim 8, wherein the request is authenticated based on the third code matching the first code.

11. The device of claim 8, wherein the one or more processors are further configured to:
determine, based on the third code matching the one or more second codes, that the third device is compromised, and
request, based on determining that the third device is compromised, an additional factor for authenticating the request; or
perform, based on the third code not matching the first code and based on the third code not matching the one or more second codes, a security action.

12. The device of claim 8, wherein the plurality of codes are transmitted according to a communication of the first device,
wherein the communication includes at least one of:
a text message,
a multimedia message,
an e-mail message, or
an audio message.

13. The device of claim 8, wherein the first code is generated using a pseudo-random code.

14. The device of claim 8, wherein the instruction includes information identifying a position, associated with the first code, relative to the one or more second codes in a list the one or more second codes.

15. A non-transitory computer-readable medium storing instructions, the instructions comprising:
one or more instructions that, when executed by one or more processors, cause the one or more processors to:
determine, based on receiving a request from a first device to access a second device, that an authentication code is needed to authenticate the request;
generate, based on determining that the authentication code is needed to authenticate the request, a plurality of codes that include:
a first code corresponding to a correct authentication code needed to authenticate the request, and
one or more second codes corresponding to one or more decoy codes;
transmit the plurality of codes to a third device;
transmit a message including an instruction for identifying the correct authentication code from the plurality of codes using user-specific data;
compare a third code received from the first device and the plurality of codes,
wherein the third code is received based on the message; and
authenticate or decline, based on comparing the third code and the plurality of codes, the request.

16. The non-transitory computer-readable medium of claim 15, wherein the one or more instructions, when executed by one or more processors, cause the one or more processors to:
transmit an authentication request that includes a request for the correct authentication code; and
receive a response to the authentication request that includes the third code.

17. The non-transitory computer-readable medium of claim 15, wherein the request is authenticated based on the third code matching the first code.

18. The non-transitory computer-readable medium of claim 15, wherein the one or more processors are further configured to:
determine, based on the third code matching the one or more second codes, that the third device is compromised, and
request, based on determining that the third device is compromised, an additional factor for authenticating the request; or
perform, based on the third code not matching the first code and based on the third code not matching the one or more second codes, a security action.

19. The non-transitory computer-readable medium of claim 15, wherein the plurality of codes are transmitted according to a communication of the first device,
wherein the communication includes at least one of:
a text message,
a multimedia message,
an e-mail message, or
an audio message.

20. The non-transitory computer-readable medium of claim 15, wherein the instruction includes information identifying a position, associated with the first code, relative to the one or more second codes in a list the one or more second codes.

* * * * *